United States Patent [19]

Margolis

[11] Patent Number: 5,039,386

[45] Date of Patent: Aug. 13, 1991

[54] ELECTROPHORETIC METHOD FOR PREPARATIVE SEPARATION OF CHARGED MOLECULES IN LIQUIDS

[75] Inventor: Joel Margolis, New South Wales, Australia

[73] Assignee: Gradient PTY Limited, Greenwich, Australia

[21] Appl. No.: 432,722

[22] PCT Filed: Apr. 5, 1988

[86] PCT No.: PCT/AU88/00098

§ 371 Date: Nov. 30, 1989

§ 102(e) Date: Nov. 30, 1989

[87] PCT Pub. No.: WO88/07406

PCT Pub. Date: Oct. 6, 1988

[30] Foreign Application Priority Data

Apr. 3, 1987 [AU] Australia ............................. PI1232
Jun. 23, 1987 [AU] Australia ............................. PI2639

[51] Int. Cl.⁵ .......................................... B01D 61/42
[52] U.S. Cl. ............................. 204/182.3; 204/182.4; 204/299 R; 204/301; 204/302; 204/305; 204/306
[58] Field of Search ............... 204/182.3, 182.4, 182.5, 204/182.6, 301, 299 R, 302, 305, 306

[56] References Cited

U.S. PATENT DOCUMENTS

| | | | |
|---|---|---|---|
| 3,079,318 | 2/1963 | Bier | 204/182.3 |
| 3,341,441 | 9/1967 | Giuffrida et al. | 204/182.4 |
| 3,989,613 | 11/1976 | Gritzner | 204/182.3 |
| 4,043,895 | 8/1977 | Gritzner | 204/182.6 |
| 4,420,383 | 12/1983 | Fujiwora et al. | 204/182.8 |

FOREIGN PATENT DOCUMENTS

854095 11/1960 United Kingdom .

Primary Examiner—T. Tung
Assistant Examiner—David G. Ryser
Attorney, Agent, or Firm—Michael J. Striker

[57] ABSTRACT

The method for electrophoretic transport of at least one solute from a first solvent stream to a second solvent stream utilizes an apparatus having a housing, a pair of electrodes positioned with the housing, each electrode being positioned adjacent one of a pair of opposite ends of the housing and each being surrounded by a device to provide a flow of a buffer around the electrode, a first inlet device through which the first solvent stream is introduced into the housing and an associated outlet device, a second inlet device through which the second solvent stream is fed into the housing and an associated outlet device, a plurality of electrophoretic membranes extending in substantially parallel, space apart, array transversely of the housing and between the electrodes, the membranes being structured to define a first solvent path for the first solvent stream and a separate second solvent path for the second solvent stream. To help prevent membrane clogging the method includes the steps of stopping or reversing the voltage across the electrodes during the electrophoretic separation while maintaining a new movement of the solute species in the desired direction from the first solvent stream to the second solvent stream and while maintaining the first solvent stream in the first solvent path and the second solvent stream in the second solvent path.

9 Claims, 6 Drawing Sheets

ELECTROPHORETIC METHOD FOR PREPARATIVE SEPARATION OF CHARGED MOLECULES IN LIQUIDS

TECHNICAL FIELD

The present invention relates to methods of, and apparatus for, preparative electrophoresis and in particular to such methods and apparatus which may be used in the large scale recovery of solute macromolecule.

BACKGROUND ART

Preparative electrophoretic separation of proteins and other compounds, i.e. separation by charge within an electric field, is normally carried out in a column of anticonvectant medium, e.g. chemical gel. The samples are delivered to the upper surface of the gel, electric potential is applied and, after a time interval, separated components emerge at the bottom of the gel column. The scale of this method of preparative separation is limited by the cross section of the gel which must not exceed the capacity of the system to remove heat generated by the current. This cross section can only be of the order of several square millimeters because of the very poor heat conductivity of the gel. The present invention aims to overcome these limitations in a number of ways.

It is also known to carry out electrophoretic separation as between free flowing streams either with free or fixed boundaries. In free boundary electrophoretic separation macromolecular species in solution, including colloidal solution, are separated as a stream of the solution is passed between charged electrodes. The stream is then divided, without remixing, into a plurality of parts with differing proportions of the molecular species present in the original stream (see U.S. Pat. No. 2,878,178, and British Patent specification 1,255,418). In fixed boundary electrophoretic separation a semipermeable membrane acts as a filter through which the liquid stream passes (see U.S. Pat. No. 3,079,318) or acts to separate two streams of liquid between which at least one molecular species migrates under the electrophoretic influence (see PCT Patent specification WO79/00002 and U.S. Pat. No. 3,989,613).

A problem with fixed boundary electrophoresis is the fouling or clogging of the membranes. The efficiency of the process depends upon:

1) maximum contact of the processed solution with the membrane surface, and
2) unimpaired permeability of the membrane pores intended to permit the passage of the macromolecules in question.

Maximum contact, in turn, depends on uniform distribution of fluid flow in the spaces between the membranes. Because of the relatively slow passage of the fluid in electrophoretic separation manifolding of the flow through parallel spaces in a stack of electrophoretic membranes as well as ensuring a uniform flow of the fluid film along each space may be difficult because of preferential channelling due to slight differences in the geometry, air locks and similar imperfections. The present invention aims, in a first aspect, to overcome this problem.

It will be realised that membrane fouling or clogging can occur in fixed boundary electrophoretic separation when the pores in the membranes approach in size the molecules being separated. In a second aspect the present invention aims to overcome this problem.

A further problem with known fixed boundary electrophoretic separation has been the difficulty in maintaining a free flow of solvent between adjacent membranes. In a third aspect the present invention provides means to effectively space adjacent membranes while allowing free flow of solute therebetween.

A still further problem with known fixed boundary electrophoretic separation apparatus has been the physical problems of filling, emptying, cleaning and reassembling of a housing containing the electrodes and membranes. Conventionally such a housing has been formed substantially integrally with associated storage tanks, pumps, cooling apparatus and the like making the housing itself difficult to handle. In a fourth aspect the present invention provides improved apparatus for overcoming these physical handling problems.

SUMMARY OF THE INVENTION

The present invention consists in a method for causing the electrophoretic migration of at least one solute from a first solvent stream to a second solvent stream in an appartus comprising a housing, a pair of electrodes positioned within the housing, each electrode being positioned adjacent one of a pair of opposed ends of the housing and each being surrounded by means to direct a flow of a suitable buffer past the electrode, first inlet means through which the first solvent stream is introduced into the housing and outlet means therefor, second inlet means through which the second solvent stream is introduced into the housing and outlet means therefor, a plurality of electrophoretic membranes extending in substantially parallel, spaced apart, array transversely of the housing and between the electrodes, the membranes serving to define a first solvent path for the first solvent stream and a separate second solvent path for the second solvent stream, the method being characterized in that the voltage across the electrodes is periodically stopped or reversed, while maintaining a net movement of the solute species in the desired direction from the first solvent stream to the second solvent stream and while maintaining the first solvent stream in the first solvent path and the second solvent stream in the second solvent path.

In a preferred embodiment of the invention the solvent in the first solvent stream is caused to flow in a pulsitile fashion.

The pulsing of the first solvent stream may be brought about by intermittently occluding elastic tubing leading from a peristaltic pump to or from the electrophoretic cell. The intermittent occlusion of such elastic tubing may be brought about directly or indirectly by a suitable cam, eccentric or like means. In an alternative preferred embodiment a pump, preferably on the downstream side of the electrophoretic cell is intermittently actuated or operated at differential speeds to produce the required pulsatile flow in the first solvent stream.

The operation of the abovementioned preferred embodiment of the invention is most easily understood with reference to a cell having only the first and second solvent streams, the first solvent stream being, so far as the solute molecules are concerned, upstream of a separating membrane and the second solvent stream being downstream thereof. In such an arrangement five phases can be discerned in the electrophoretic migration:

1) Upstream fluid phase;
2) Upstream interface with membrane;
3) Membrane gel;
4) Downstream interface;

5) Downstream fluid phase;

Optimal requirements for each of these phases are different:

1. Electrophoretic migration in the upstream fluid will be disturbed by a rapid turbulent flow. On the other hand a flow rate may be so slow that all the relevant components will migrate to the proximal part of the membrane, and a large distal part of the membrane may not participate in the process. Thus a preferred flow pattern in this phase is stepwise with one step following: designed to replace quickly the spent solution with a fresh one, followed by a stationary period to allow migration to the membrane. The optimal volume and duration of each cycle will depend on the prevailing conditions.

2. The upstream fluid/membrane boundary may be blocked by obstructed molecules forming an insoluble film on the surface, a condition called "fouling" in filtration processes. When necessary this can be counteracted by temporarily reversing the electric field toward the end of each cycle to detach the aggregating molecules. Frequency and duration of field reversal must be determined experimentally and may be controlled manually or automatically by monitoring changes in electrical conductivity of the stack during each phase or cycle.

3. Within the membrane the transport is dependent mainly on the characteristics of current and membrane composition and is isolated from the flow mechanics.

4. In the downstream fluid phase a vigorous cross flow is desirable because it prevents molecules adhering to limiting membranes separating the solvent from the buffer streams and offers the opportunity for heat removal with the aid of an external heat exchanger.

The pulsatile flow will, to some extend, reduce surface fouling of the membranes, however, additionally the shape of the electric field according to this invention can prevent membrane occlusion. While the mechanism whereby the periodic reversal of the polarity of the electrophoretic cell is quite complex and, among other factors, is influenced by brownian movement and adsorbtion onto the membrane, it is considered that the action can be likened to a sieve in which the screening of particles is promoted by vibration of the sieve.

Adjacent membrane in the apparatus in which the present method is carried out are preferably separated by a pair of substantially parallel screens. In a preferred embodiment of the invention the parallel screens are woven and are so selected that the meshes thereof cannot nest with one another. Ordinarily the spaces between adjacent membranes are maintained by intervening gaskets and mesh screens which prevent the membranes from adhering to each other. However, it was observed that without the benefit of high positive pressure the membranes tend to cling to the surface of the mesh causing almost complete obstruction of the flow. The use of at least two adjacent screens to define the spaces between the membranes was found to greatly improve the flow. Further improvement was introduced following the observation that parallel screens of the same mesh size tend to partially nest into each other causing an interference with a free flow. This is preferably prevented by ensuring that the mesh of adjacent screens is not identical. For example, a square mesh may alternate with a diagonal mesh or the adjacent screens may be made of different mesh size (e.g. with 0.3 and 0.4–0.5 mm openings). Preferably the two screens are incorporated into a single molded gasket to minimize handling.

In a conventional filter stack the fluid is forcibly pumped to create a cross flow in the spaces between membranes, the whole stack being sandwiched between rigid walls to prevent disruption by the high internal pressure. This configuration is not suitable for electrophoresis because the support walls would interfere with the electric field across the stack and with the removal of gases generated by the electrodes. In the present invention the stack is preferably kept collapsed without the aid of external supports by placing the pumps on the downstream side i.e. on the downstream side of the electrophoretic cell, so that the flow is effected by suction, while the fluid enters the stack passively to replace the fluid removed by the pumps. On the other hand the external buffer circulation is preferably maintained by a positive pressure which also helps to maintain the stack in a compressed state. Alternatively, the compartments carrying the circulating buffer may be pressurized and the flow through the stack effected by a positive pressure feed which is kept lower than the external buffer pressure. The maintenance of free flow and even distribution of fluid within the stack is essential for effective separation. Elongate, flexible inlet and outlet tubes, preferably from the buffer and solvent streams, are provided to connect the electrophoretic cell and supply and/or discharge tanks for the buffer and solvent streams. The inlet and outlet tubes are preferably bound together to form a single umbilicus. This arrangement facilitates the free movement of the cell relative to the remainder of the apparatus. The cell so connected to the remainder of the apparatus is preferably mounted so that it may be tilted in at least one plane which facilitates filling and emptying the electrophoretic cell.

The method according to this invention is preferably carried out in an apparatus for the electrophoretic separation of molecular species present in a liquid into at least two component groups, comprising a housing, a pair of electrodes positioned within the housing, each electrode being positioned adjacent one of a pair of opposed ends of the housing and each being surrounded by means to direct a flow of a suitable buffer past the electrode, a plurality of semi-permeable membranes divided into at least two groups, the membranes of each group extending in substantially parallel, spaced apart, array across the housing intermediate the electrodes to form a plurality of chambers, each group of chambers being separated from adjacent groups of chambers by barriers which do not interrupt the passage of an electric current between the electrodes but will effectively prevent liquid flow therethrough, an inlet into each of the chambers of one group thereof, an outlet from each of the chambers of one group thereof, each chamber of one group being connected in parallel or in a series with a corresponding chamber of the, or each, other group such that liquid may pass therethrough from the respective inlet to the respective outlet.

In one embodiment of this apparatus the membranes in each group diminish in pore size in the direction of migration of the molecular species being spearated. Normally all of the molecular species to be separated will be introduced into a first liquid stream flowing through a first chamber of each group. The molecular species will pass, under the influence of the electrophoretic potential into a second, third, etc., one of the chambers according to the respective molecular size of each of the species. It is also possible however to introduce the molecular species into the liquid stream flowing through two or more of the chambers of each group.

The chambers are preferably formed by combined gaskets and screens positioned between adjacent membranes. The inlet and outlet passages and the passages interconnecting the corresponding chambers of the various groups passing through the abutted membranes and gaskets.

The membranes used in the methods and apparatus according to the various aspects of the present invention are preferably formed by a polyacrylamide gel. One advantage of polyacrylamide gel as a matrix for electrophoretic separation is the ease of manufacture and of controlling the pore size within wide limits. However, the polymer is too friable to be handled as thin membranes. This can be overcome by making use of sheets of porous material, such as paper or fabric impregnated with polyacrylamide.

In the present invention the electrodes are preferably surrounded by a jacket of flowing buffer which is pumped to and from a distant tank or tanks, heat and gas bubbles being removed in the process. The electrodes may be made of a thin platinum wire but plate or foil of a suitable material could be used. The buffer may be separated from the liquid stream containing the molecular species to be separated by a membrane of sufficiently small pore size. Alternatively, in the case of wire electrodes, the electrodes may be encased individually by hollow fibres or tubes of semipermeable material carrying the circulating buffer.

Unless a complete separation can be accomplished in a single passage, the feed solution can be recirculated. In this case it is desirable to prevent mixing of the weaker return solution with the richer residue in the reservoir. A "raft" floating on the surface of the residual fluid can be used to dissipate the kinetic energy of the returning stream which will then be layered gently above the residual solution. In addition some kind of anticonvectant packing (e.g. beads, sponge or chain) can be used in the recirculation tank. Similarly, recirculation of the downstream effluent can be used for progressive concentration of the extracted components.

Preferably the upstream flow is intermittent and involves a near complete exchange of the solution in the stack. This can be effected by a piston pump (e.g. a syringe) with a one way inlet and outlet valves. The pump is preferably positioned on the downstream side of the stack. Preferably the pump mechanism is linked with the current reversal switch to ensure synchronous operation as in the following example:
1. Stroke 1 (e.g. 5 seconds). Plunger out, pump filled with the solution withdrawn from the stack (replaced by fresh fluid sucked from the reservoir).
2. Interval (e.g. 60 seconds) for electrophoretic transport, while the plunger is being slowly depressed, expelling pump effluent to a collection or recirculation reservoir. Current may be reversed by a linked mechanism during the last few seconds of the cycle.

At the same time the downstream flow is controlled independently as described above. It is important however to maintain the mean pressure within the stack less than that in the buffer solutions to maintain the stack in a compressed condition. Advantage may be had where one of the solute macromolecular containing streams is caused to flow in a pulsitile manner to momentarily cause the pressure therein to equal or just exceed the pressure in the buffer solution.

The solutions of the macromolecular solute species may be true solutions or colloidal solutions.

The various aspects of the present invention taken together or separately assist in the separation of solute macromolecules on a much larger scale than has previously been possible. Proteins may, for instance, be recovered in amounts exceeding 100 g/hr.

BRIEF DESCRIPTION OF THE DRAWINGS

Hereinafter given by way of example only is a preferred embodiment of the present invention described with reference to the accompanying drawings in which.

BEST MODE OF CARRYING OUT THE INVENTION

Figure 1:
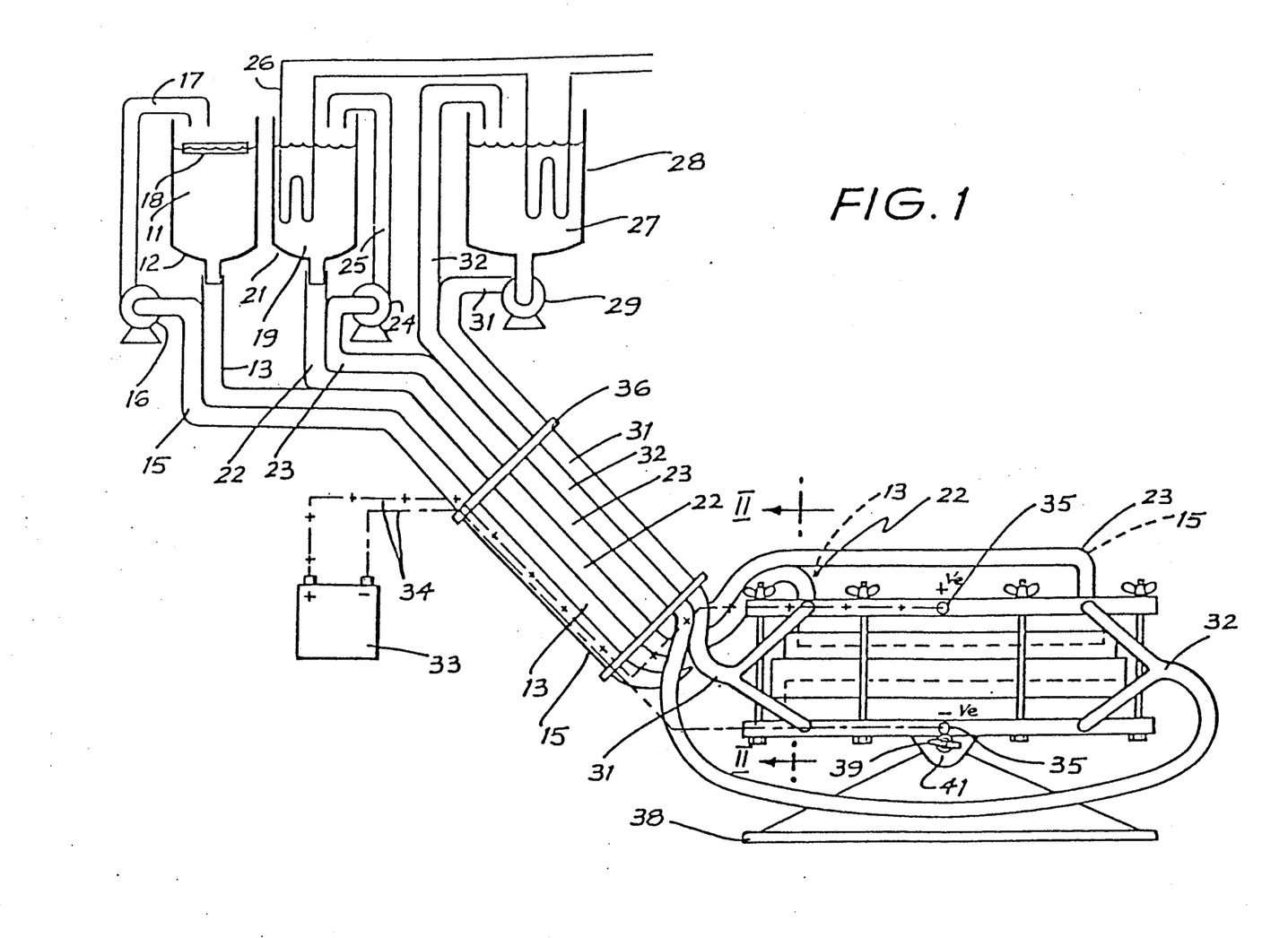
FIG. 1 is a diagrammatic perspective view of an electrophoretic apparatus according to the present invention.

The electrophoretic apparatus 10 includes a housing which contains electrodes and an array of electrophoretic membranes as will be hereinafter described, sources of supply of an upstream liquid containing a solute, a downstream liquid and a buffer solution, suitable pumps and ducting and a source of electrical potential for causing the solute to move electrophoretically across the intervening membranes between the upstream liquid and the downstream liquid.

The upstream liquid 11 is contained within an open topped container 12. The upstream liquid flows from container 12 through tube 13 to the housing 14. It returns from the housing 14 through tube 15, pump 16 and tube 17 to the container 12. A floating pad of material 18 is provided in container 12 such that the returning, generally less dense, upstream liquid introduced into container 12 does not mix unduly with the, generally more dense, upstream liquid already in the container 12.

The downstream liquid 19 is contained within an open-topped container 21. The downstream liquid flows from container 21 through tube 22 to the housing 14. It returns from the housing 14 through tube 23, pump 24 and tube 25. Cooling means 26 comprising a coil through which a refrigerant passes is immersed in the downstream liquid 19 in container 21 to cool the downstream liquid. Alternatively, or in addition, either or both of the upstream and downstream liquids could be passed through a coil immersed in a cooling bath.

The buffer solution 27 is contained in an open topped container 28. It is pumped by pump 29 through tube 31 to housing 14 from whence it returns through tube 32 to container 28. Cooling means 26 includes a cooling coil in container 28 to cool the buffer solution 27. Each of the tubes 31 and 32 is bifurcated adjacent the housing 14 such that a separate buffer stream flows past each of the electrodes in the housing 14.

A D.C. power supply 33 provides a source of electric potential to drive the electrophoretic migration of solute molecules from the upstream liquid into the downstream liquid. The power supply 33 is connected by wires 34 to terminals 35 on the housing 14.

The upstream liquid tubes 13 and 15, the downstream liquid tubes 22 and 23, the buffer tubes 31 and 32 and the wires 34 are all bound together by bundle ties 36 to form a single umbilical cord 37. This allows ready movement of the housing 14 relative to the other components in the electrophorectic apparatus 10.

The housing 14 is pivotably mounted on a stand 38 by a bolt 39 which passes through a hole in stand 38 and a corresponding hole in a tab 41 extending from the underside of housing 14. Loosening of bolt 39 allows the housing to be pivoted about the axis of the bolt. This allows for lowering the inlet end of the housing 14 when the housing is first being charged with the upstream, downstream and buffer liquids. Such a procedure helps reduce the development of air locks in the housing 14. Similarly the housing 14 may be more conveniently drained by depressing the outlet end of the housing 14.

Figure 2:
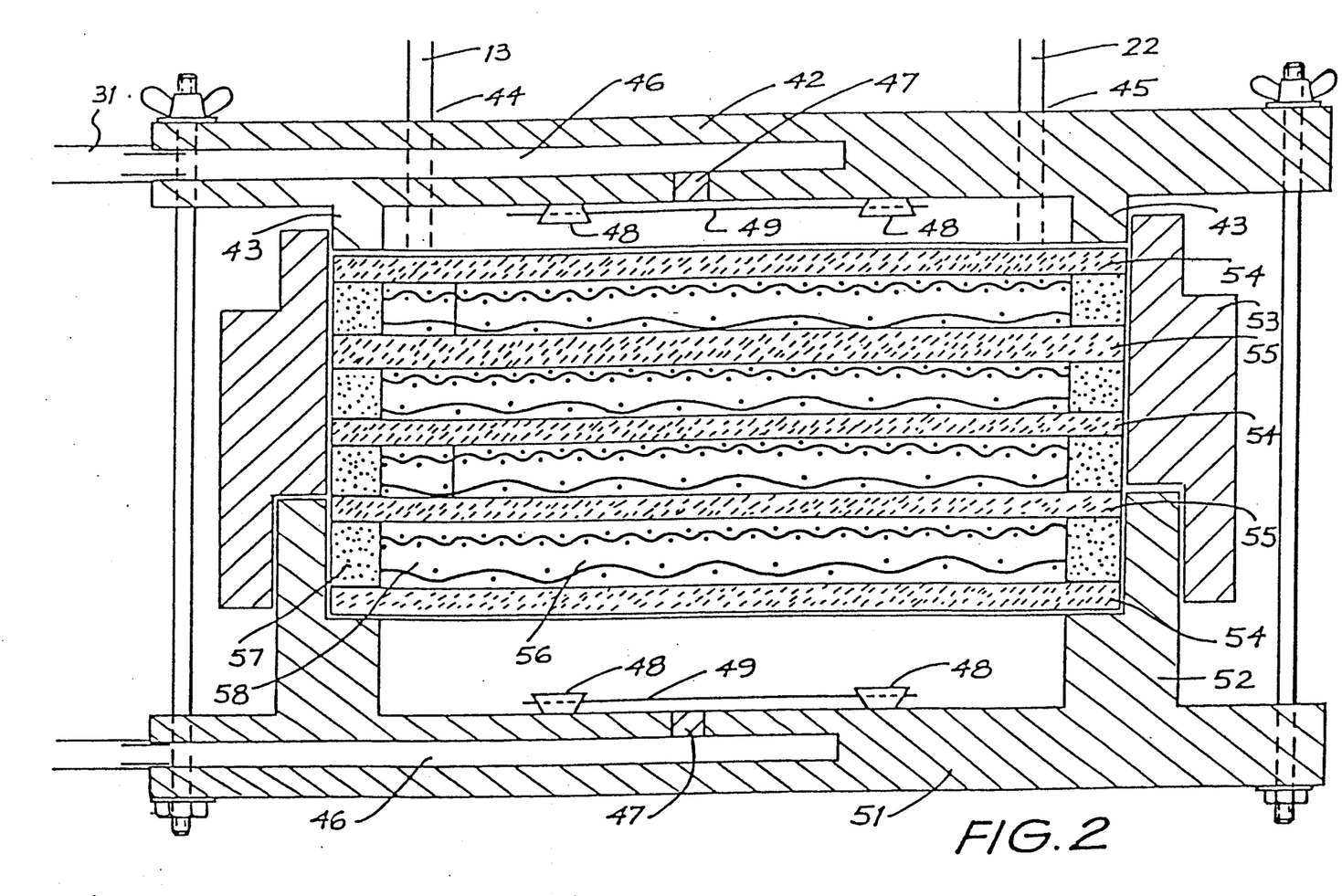
FIG. 2 is a cross sectional view through II—II of FIG. 1.

The housing 14 includes a rectangular top plate 42 having on its undersurface a rectangular rib 43. Adjacent one end the top plate 42 is formed with vertical holes 44 and 45 which extend through top plate 42 and rib 43 adapted to receive tubes 13 and 22 respectively while the other end of the tap plate 42 is similarly formed with holes (not shown) to receive tubes 15 and 23. A bore 46 extends horizontally into the top plate 42 adjacent the one end thereof and is adapted for connection to one arm of the tube 31. A side hole 47 connects bore 46 with the underside of the top plate 42. Similarly a bore (not shown) is provided at the other end of the top plate for connection with one arm of the tube 32.

The underside of the top plate 42, within the area bounded by the rib 43 is provided with a plurality of cleats 48 to hold in place a platinum electrode wire 49 which is connected to one of the terminals 35.

The housing 14 further includes a bottom plate 51 which is similarly provided at one end with a bore 46 and a side hole 47 to introduce buffer solution 27 through one arm of tube 31 and at the other end with a further bore (not shown) for connection to buffer discharge tube 32; and with cleats 48 for electrode wire 49. The bottom plate 51 is provided on its upper surface with a rectangular rib 52 having internal dimensions just larger than the outside dimensions of rib 43.

A rectangular spacer frame 53 completes the housing 14 and is disposed between the top plate 42 and bottom plate 51. The spacer frame closely surrounds each of the ribs 43 and 52.

An array of boundary membranes 54, electrophoretic membranes 55 and spacers 56 are disposed in parallel planar array within the housing 14. The boundary membranes 54 are disposed at the top and bottom of the membrane stack and at is midpoint. The boundary membranes 54 are so constructed that they prevent the passage of the solute macromolecules while permitting the passage of an electric current carried by small ions of the buffer. At each end the bondary membranes are formed with holes in alignment with the holes 44 and 45 in the one end of top plate 42 and the corresponding holes at its other end.

Each of the electrophoretic membranes 55 is so constructed to allow passage of at least the desired solute molecule therethrough. The membranes 55 are also formed at each end with holes in alignment with holes 44 and 45 in the one end of top plate 42 and the corresponding holes at its other end.

Figure 3:
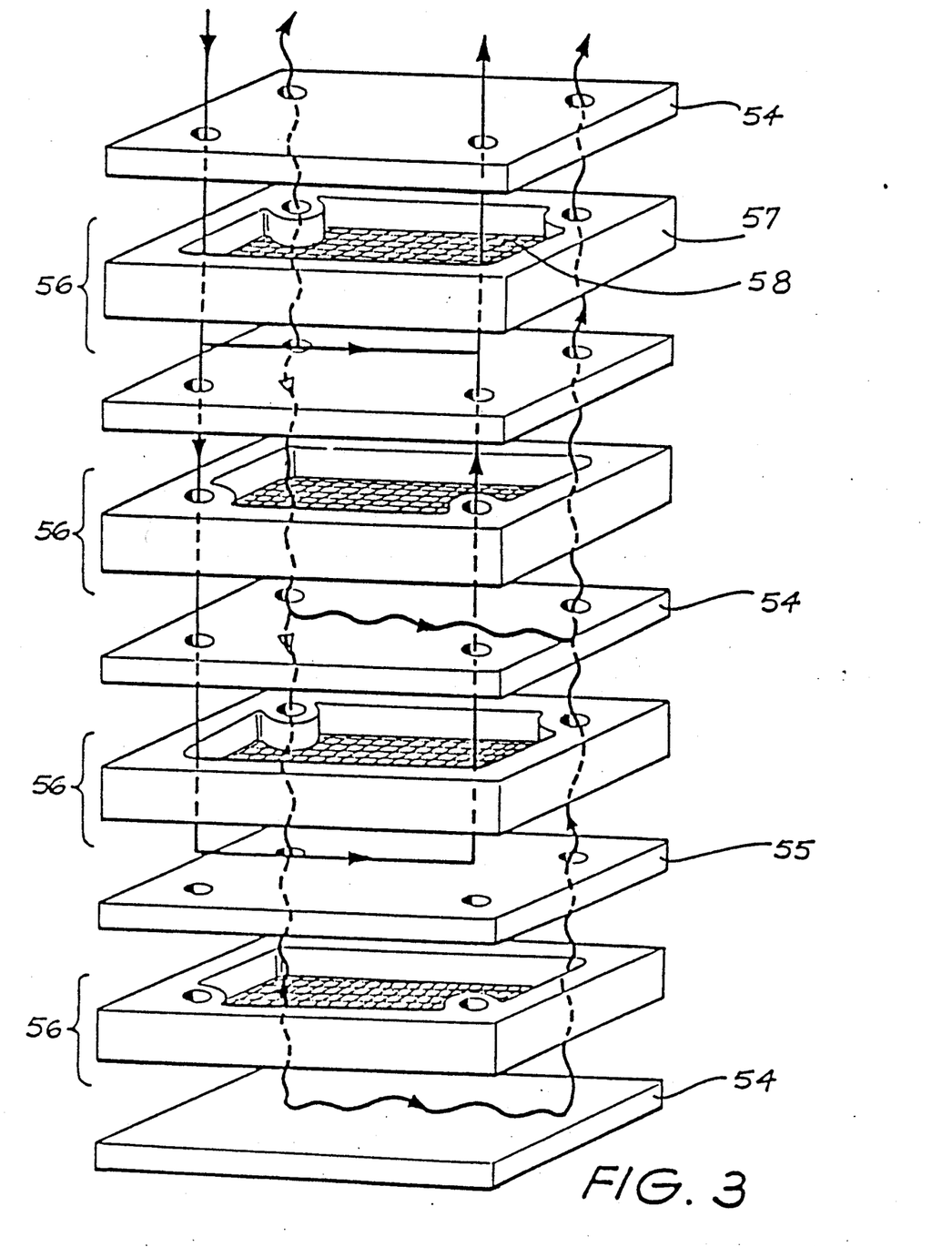
FIG. 3 is a diagrammatic exploded view of a stack of the membranes for use in the electrophoretic apparatus of FIG. 1.

Each of the adjacent boundary membranes 54 and electrophoretic membranes 55 is separated by a spacer 56 comprising a peripheral gasket 57 surrounding, and formed integrally with, a pair of plastic mesh screens 58 lying in parallel face to face array, the two screens 58 are either of different mesh size or the respective warps and wefts of the meshes are disposed at an angle to one another so that the two meshes cannot nest together. Each spacer is provided with two holes at each end to correspond to the holes in the ends of the membranes 54 and 55. One of each of these holes is however surrounded by the gasket. The correct arrangement of the screens keeps the upstream and downstream liquid streams separate while allowing the two streams to flow along opposite side of each of the electrophoretic membranes as shown in FIG. 3. The arrangement shown in FIG. 3 provides for a pair of electrophoretic membranes 55 operating in parallel. In alternative arrangements the gaskets may be constructed to provide for two or more groups of membranes, each group being subdivided by one or more electrophoretic membranes to form a plurality of chambers which are joined in series or in parallel. If more than one electrophoretic membrane is provided in each chamber, as is required if more than two solvent streams are being used, the electrophoretic membranes may be of different pore sizes. Preferably the pore sizes diminish in the direction of migration of the, or one of the, solute species.

Figure 4:
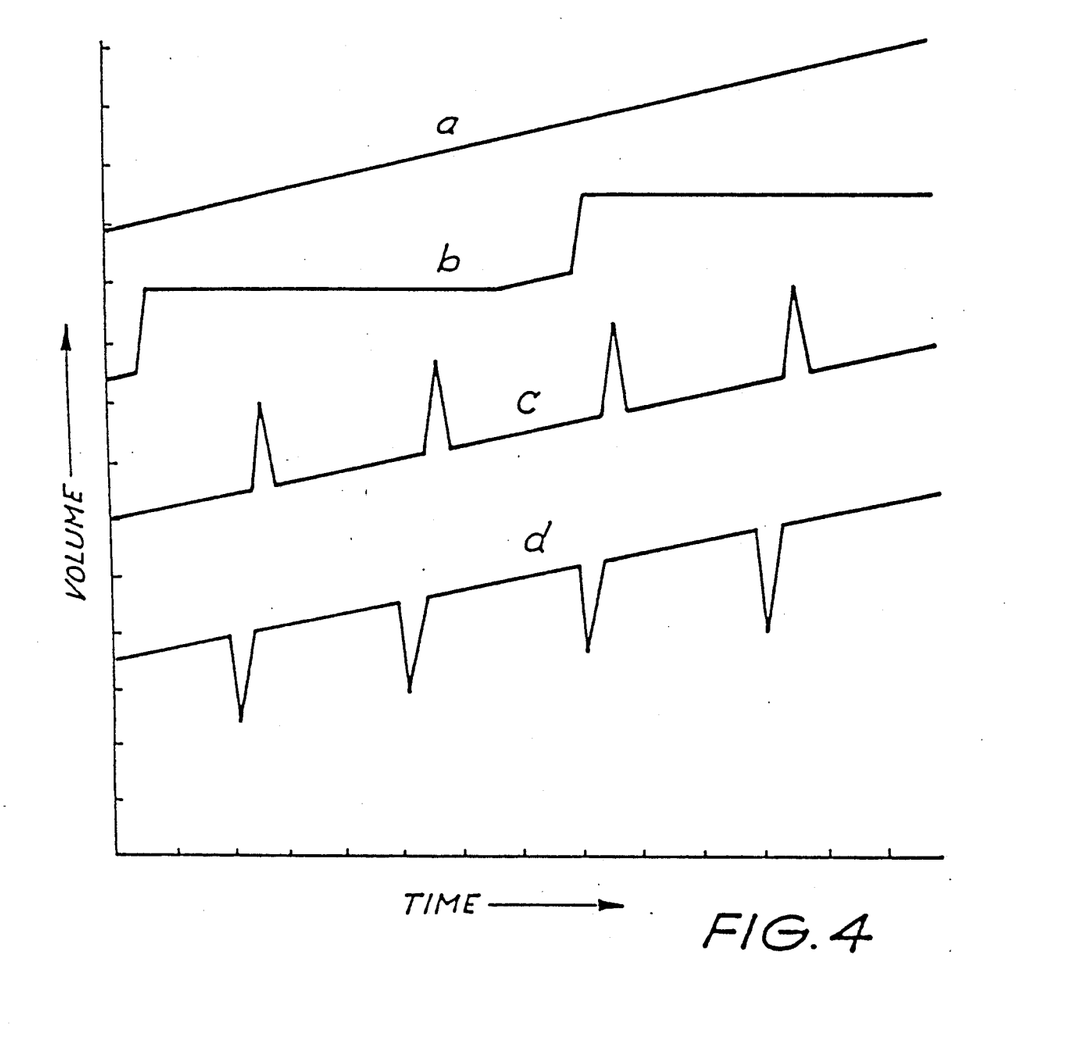
FIG. 4 is a graph showing a number of possible variations in flow rate of the upstream and downstream fluids through the electrophoretic apparatus of FIG. 1.

In operation buffer solution 27 is passed rapidly, at low pressure, through the spaces surrounding the electrodes 49 adjacent the top plate 42 and bottom plate 51. This flow of buffer solution 27 serves to remove heat and gas bubbles from housing 14. The flow of downstream liquid 19 is preferably continuous through the housing 14 as shown by flow line (a) of FIG. 4.

The flow of the upstream liquid 11 through the housing 14 is preferably carried out in a pulsitile fashion. In embodiment (b) of FIG. 4 the flow is intermittently stopped by stopping pump 16 or by otherwise occluding the flow. The sawtooth flow pattern of embodiments (c) and (d) may be achieved by a series of sudden compressions of the tube 13 or 15 e.g. by the impact of a falling weight operated by a cam. The pulses will be in the positive or negative direction depending on whether the pump is on the upstream side (c) or downstream (d) of the housing 14. In each case the net total flow is not altered. The optimum frequency, shape and amplitude of the pulses may be determined experimentally by routine testing.

Figure 5:
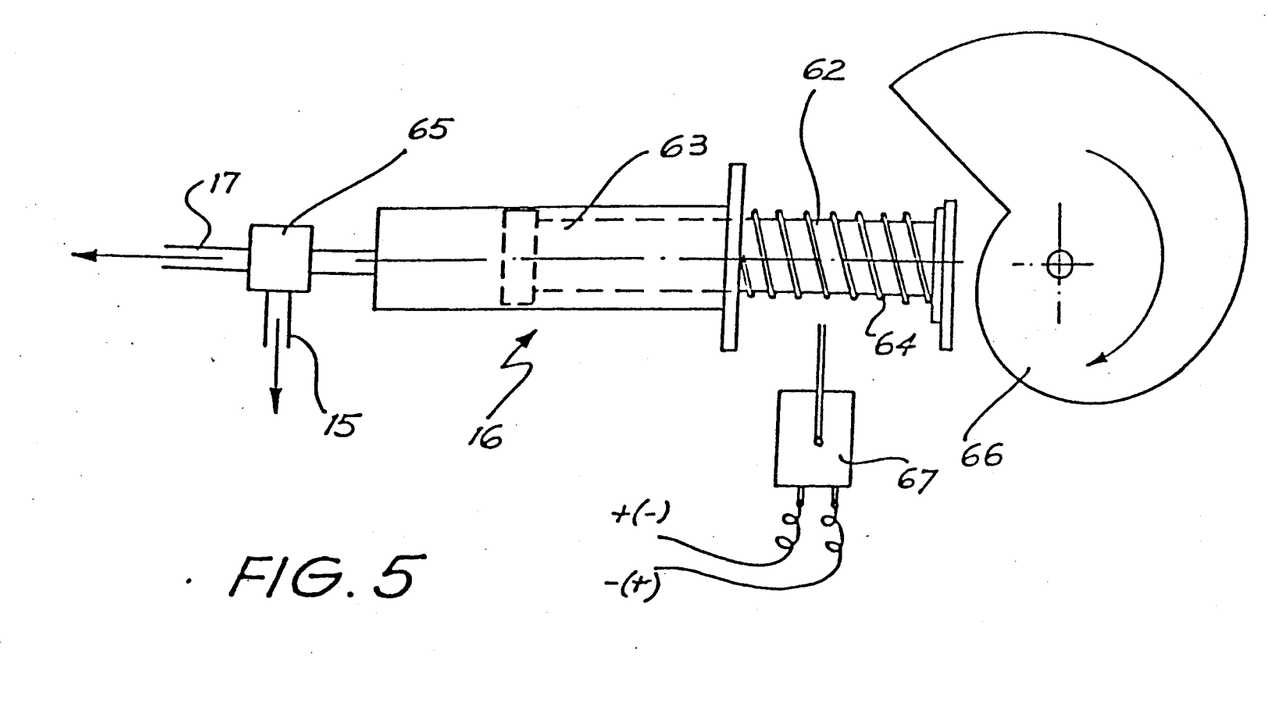
FIG. 5 is a diagrammatic longitudinal sectional view through a pump for use in the electrophoretic apparatus according to the present invention.

FIG. 5 shows a preferred pump 16 for pumping the upstream solvent 11 through the housing 14. The pump 16 comprises a piston 62 moveable in a cylinder 63 and biased outwardly therefrom by a spring 64. The cylinder 63 is in fluid communication with a pair of one way valves shown at 65. The piston 62 is operated by rotation of a cam 66 as indicated. The cam 66 slowly depresses the piston 62. As the piston approaches the end of its travel it contacts switch 67 to reverse the polarity of the electrodes. As the cam step passes beyond the piston 62 the spring causes the piston to draw backwards quickly. This rapid back movement of the piston 62 recontacts the switch to restore the normal polarity to the electrodes and simultaneously causes a rapid flow of solvent through the housing 14.

Figure 6:
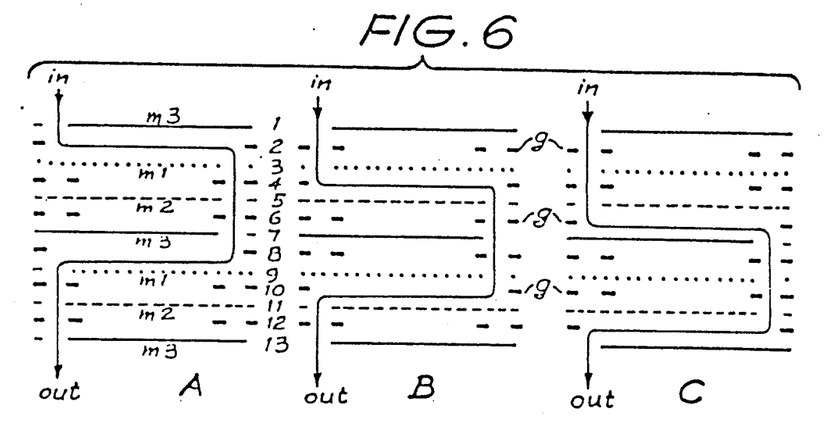
FIGS. 6 and 7 respectively show diagrammatically a more complex array of membranes and gaskets for use in the electrophoretic apparatus of FIG. 1.
Figure 7:
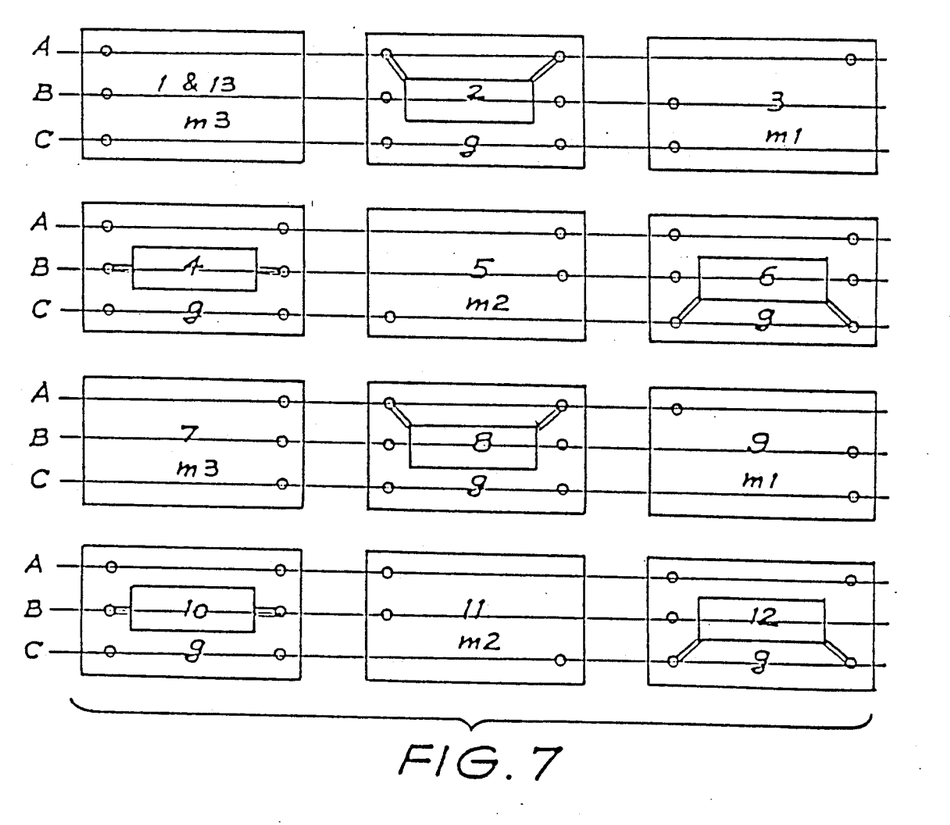

A further development of flow distribution in the separation stack is illustrated in FIGS. 6 and 7, in which FIG. 6 shows three exploded sections through different planes (A,B,C). The 12 numbered drawings of FIG. 7 show the sequence of the individual elements with the letters and numbers corresponding to the ones in the sections. In this case the spaces are connected not by external tubing but by an internal arrangement of perforations in the membranes and gates in the gaskets. By way of example the stack has three inlets (in) and outlets (out) corresponding to three separate streams shown in the sections by arrowed lines. Also the sequence of membranes (e.g. of decreasing permeability), $m_1$, $m_2$ and $m_3$, and corresponding gaskets (g) is repeated once to increase the surface area. The gaskets have three pairs of openings but only one of these pairs is connected to the central space by gates (parallel lines in the plane view). The membranes ($m_{1,2,3}$) have matching perforations, shown as circles in three positions selected so as to keep the three streams separate by directing the flow through the appropriate spaces, e.g. A-through 2 and 8, B-through 4 and 10 and C-through 6 and 12. It is to be understood that the number of streams can be increased horizontally e.g. by repeating the same sequence (in a larger version of the apparatus) to increase throughput or by adding new membranes with differing characteristics. The number of cycles of membranes etc. in the stack can also be multiplied as required to increase the scale of separation. It is also envisaged that pre-assembled modules can be manufactured to be used in or included into a separation stack.

I claim:

1. In a method for causing electrophoretic migration of at least one solute from a first solvent stream to a second solvent stream in an apparatus comprising a housing, a pair of electrodes positioned in the housing, each of the electrodes being positioned adjacent one of a pair of opposite ends of the housing and each of the electrodes being surrounded by means to direct a flow of a buffer past the electrode, first inlet means through which the first solvent stream is fed into the housing and associated first outlet means, second inlet means through which the second solvent stream is fed into the housing and associated second outlet means, a plurality of electrophoretic membranes extending in substantially parallel, spaced apart, array transversely of the housing and between the electrodes, the membranes being structured to form a first solvent path for the first solvent stream and a separate second solvent path for the second solvent stream, the improvement comprising the step of periodically one of stopping and reversing a voltage applied across the electrodes, while maintaining a net movement of the solute from the first solvent stream to the second solvent stream and while maintaining the first solvent stream in the first solvent path and the second solvent stream in the second solvent path.

2. The improvement as defined in claim 1, further comprising the step of producing a pulsatile flow of the first solvent stream through the housing.

3. The improvement as defined in claim 2, wherein in the step of producing the pulsatile flow of the first solvent stream through the housing the first solvent stream is caused to proceed at a comparatively faster flow rate for a comparatively shorter time period and then at a comparatively slower flow rate for a comparatively longer time period and the voltage applied across the electrodes is one of stopped and reversed near the finish of each of the comparatively longer time periods of the slower flow.

4. The improvement as defined in claim 1, further comprising the step of separating each of adjacent ones of the membranes by a pair of substantially parallel screens, each of the screens having a mesh.

5. The improvement as defined in claim 4, wherein the parallel screens are woven and so selected that the meshes cannot nest with each other.

6. The improvement as defined in claim 1, further comprising the step of pumping the solvent streams through the housing at a pressure which is less than that of the buffer.

7. The improvement as defined in claim 1, in which the apparatus used to perform the method includes a supply and discharge container for each of the first and second solvent streams and the buffer and further comprising the steps of connecting the housing through a plurality of elongated flexible tubes to the supply and discharge containers for the first and second solvent stream and the buffer and binding the flexible tubes together into a single umbilicus.

8. The improvement as defined in claim 2, further comprising the step of dividing the membranes in the housing into at least two groups, the membranes in each of the groups extending in substantially parallel, spaced apart, array across the housing between the electrodes to form a plurality of chambers, each group of chambers being separated from adjacent groups of chambers by barriers, said barriers not interrupting an electric current between the electrodes but effectively preventing liquid flow therethrough, each of the chambers of one group being connected in parallel or in series with a corresponding chamber of the, or each other group of chambers such that the first and second solvent streams pass through arrays of the chambers.

9. The improvement as defined in claim 1, further comprising providing more than two of the solvent streams and separating each of the solvent streams from an adjacent one of the solvent streams by one of the membrane, the membrane separating the solvent streams having pore sizes decreasing in a direction in which electrophoretic migration of the solute occurs.

* * * * *

UNITED STATES PATENT AND TRADEMARK OFFICE
CERTIFICATE OF CORRECTION

PATENT NO. : 5,039,386

DATED : August 13, 1991

INVENTOR(S) : Joel Margolis

It is certified that error appears in the above-identified patent and that said Letters Patent is hereby corrected as shown below:

On the title page:

The name of the assignee should read --Gradipore Limited--

Signed and Sealed this

Twenty-third Day of February, 1993

Attest:

STEPHEN G. KUNIN

*Attesting Officer*     *Acting Commissioner of Patents and Trademarks*

REEXAMINATION CERTIFICATE (3216th)
United States Patent [19]
Margolis

[11] B1 5,039,386
[45] Certificate Issued Jun. 10, 1997

[54] ELECTROPHORETIC METHOD FOR PREPARATIVE SEPARATION OF CHARGED MOLECULES IN LIQUIDS

[75] Inventor: Joel Margolis, New South Wales, Australia

[73] Assignee: Gradipore Limited, Pyrmont, Australia

Reexamination Request:
No. 90/004,154, Feb. 26, 1996

Reexamination Certificate for:
Patent No.: 5,039,386
Issued: Aug. 13, 1991
Appl. No.: 432,722
Filed: Nov. 30, 1989

Certificate of Correction issued Feb. 23, 1993.

[22] PCT Filed: Apr. 5, 1988
[86] PCT No.: PCT/AU88/00098
§ 371 Date: Nov. 30, 1989
§ 102(e) Date: Nov. 30, 1989
[87] PCT Pub. No.: WO88/07406
PCT Pub. Date: Oct. 6, 1988

[30] Foreign Application Priority Data

Apr. 3, 1987 [AU] Australia .................... PI1232
Jun. 23, 1987 [AU] Australia .................... PI2639

[51] Int. Cl.⁶ .................................................. B01D 61/42
[52] U.S. Cl. ........................ 204/466; 204/518; 204/616; 204/639
[58] Field of Search ................. 204/621, 627, 204/628, 630, 631, 632, 633, 634, 635, 636, 637, 638, 639, 640, 644, 648

[56] References Cited

U.S. PATENT DOCUMENTS

| | | | |
|---|---|---|---|
| 3,099,615 | 7/1963 | Kollsman | 204/525 |
| 3,341,441 | 9/1967 | Giuffrida et al. | 204/525 |
| 3,972,791 | 8/1976 | Stern | 204/522 X |
| 4,115,225 | 9/1978 | Parsi | 204/525 |
| 4,758,320 | 7/1988 | Sanchez et al. | 204/544 |

FOREIGN PATENT DOCUMENTS 2118975 11/1983 United Kingdom.

*Primary Examiner*—Kathryn Gorgos

[57] ABSTRACT

The method for electrophoretic transport of at least one solute from a first solvent stream to a second solvent stream utilizes an apparatus having a housing, a pair of electrodes positioned with the housing, each electrode being positioned adjacent one of a pair of opposite ends of the housing and each being surrounded by a device to provide a flow of a buffer around the electrode, a first inlet device through which the first solvent stream is introduced into the housing and an associated outlet device, a second inlet device through which the second solvent stream is fed into the housing and an associated outlet device, a plurality of electrophoretic membranes extending in substantially parallel, space apart, array transversely of the housing and between the electrodes, the membranes being structured to define a first solvent path for the first solvent stream and a separate second solvent path for the second solvent stream. To help prevent membrane clogging the method includes the steps of stopping or reversing the voltage across the electrodes during the electrophoretic separation while maintaining a new movement of the solute species in the desired direction from the first solvent stream to the second solvent stream and while maintaining the first solvent stream in the first solvent path and the second solvent stream in the second solvent path.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3, 4, 6, 7, 8 and 9 are determined to be patentable as amended.

Claim 5, dependent on an amended claim, is determined to be patentable.

New claims 10 and 11 are added and determined to be patentable.

1. [In a] *A* method for causing electrophoretic migration of at least one *macromolecular* solute from a first solvent stream to a second solvent stream in an apparatus comprising a housing, a pair of electrodes [positioned] *position* in the housing, each of the electrodes being positioned adjacent one of a pair of opposite ends of the housing and each of the electrodes being surrounded by means to direct a flow of a buffer past the electrode, first inlet means through which the first solvent stream is fed into the housing and associated first outlet means, second inlet means through which the second solvent stream is fed into the housing and associated second outlet means, a plurality of electrophoretic membranes extending in substantially parallel, spaced apart, array transversely of the housing and between the electrodes, the membranes being structured to form a first solvent path for the first solvent stream and a separate second solvent path for the second solvent stream, the improvement comprising the step of periodically one of stopping and reversing a voltage applied across the electrodes, while maintaining a net movement of the *macromolecular* solute from the first solvent stream to the second solvent stream and while maintaining the first solvent stream in the first solvent path and the second solvent stream in the second solvent path, *and producing a pulsatile flow of the first solvent stream through the housing.*

3. The improvement as defined in claim [2] *1*, wherein in the step of producing the pulsatile flow of the first solvent stream through the housing the first solvent stream is caused to proceed at a comparatively faster flow rate for a comparatively shorter time period and then at a comparatively slower flow rate for a comparatively longer time period and the voltage applied across the electrodes is one of stopped and reversed near the finish of each of the comparatively longer time periods of the slower flow.

4. [The improvement as defined in claim 1, further comprising the step of] *A method for causing electrophoretic migration of at least one macromolecular solute from a first solvent stream to a second solvent stream in an apparatus comprising a housing, a pair of electrodes position in the housing, each of the electrodes being positioned adjacent one of a pair of opposite ends of the housing and each of the electrodes being surrounded by means to direct a flow of a buffer past the electrode, first inlet means through which the first solvent stream is fed into the housing and associated first outlet means, second inlet means through which the second solvent stream is fed into the housing and associated second outlet means, a plurality of electrophoretic membranes extending in substantially parallel, spaced apart, array transversely of the housing and between the electrodes, the membranes being structured to form a first solvent path for the first solvent stream and a separate second solvent path for the second solvent stream, the improvement comprising the step of periodically one of stopping and reversing a voltage applied across the electrodes, while maintaining a net movement of the macromolecular solute from the first solvent stream to the second solvent stream and while maintaining the first solvent stream in the first solvent path and the second solvent stream in the second solvent path, and* separating each of adjacent ones of the membranes by a pair of substantially parallel screens, each of the screens having a mesh.

6. [The improvement as defined in claim 1, further comprising the step of] *A method for causing electrophoretic migration of at least one macromolecular solute from a first solvent stream to a second solvent stream in an apparatus comprising a housing, a pair of electrodes position in the housing, each of the electrodes being positioned adjacent one of a pair of opposite ends of the housing and each of the electrodes being surrounded by means to direct a flow of a buffer past the electrode, first inlet means through which the first solvent stream is fed into the housing and associated first outlet means, second inlet means through which the second solvent stream is fed into the housing and associated second outlet means, a plurality of electrophoretic membranes extending in substantially parallel, spaced apart, array transversely of the housing and between the electrodes, the membranes being structured to form a first solvent path for the first solvent stream and a separate second solvent path for the second solvent stream, the improvement comprising the step of periodically one of stopping and reversing a voltage applied across the electrodes, while maintaining a net movement of the macromolecular solute from the first solvent stream to the second solvent stream and while maintaining the first solvent stream in the first solvent path and the second solvent stream in the second solvent path, and* pumping the solvent streams through the housing at a pressure which is less than that of the buffer.

7. [The improvement as defined in claim 1 in which] *A method for causing electrophoretic migration of at least one macromolecular solute from a first solvent stream to a second solvent stream in an apparatus comprising a housing, a pair of electrodes position in the housing, each of the electrodes being positioned adjacent one of a pair of opposite ends of the housing and each of the electrodes being surrounded by means to direct a flow of a buffer past the electrode, first inlet means through which the first solvent stream is fed into the housing and associated first outlet means, second inlet means through which the second solvent stream is fed into the housing and associated second outlet means, a plurality of electrophoretic membranes extending in substantially parallel, spaced apart, array transversely of the housing and between the electrodes, the membranes being structured to form a first solvent path for the first solvent stream and a separate second solvent path for the* second solvent stream, the improvement comprising the step of periodically one of stopping and reversing a voltage applied across the electrodes, while maintaining a net movement of the macromolecular solute from the first solvent stream to the second solvent stream and while maintaining the first solvent stream in the first solvent path and the second solvent stream in the second solvent path, and the apparatus used to perform the method includes a supply and discharge container for each of the first and second solvent streams and the buffer and further comprising the steps of connecting the housing through a plurality of elongated flexible tubes to the supply and discharge containers for the first and second solvent stream and the buffer and binding the flexible tubes together into a single umbilious.

8. The improvement as defined in claim [2] *1*, further comprising the step of dividing the membranes in the housing into at least two groups, the membranes in each of the groups extending in substantially parallel, spaced apart, array across the housing between the electrodes to form a plurality of chambers, each group of chambers being separated from adjacent groups of chambers by barriers, said barriers not interrupting an electric current between the electrodes but effectively preventing liquid flow therethrough, each of the chambers of one group being connected in parallel or in series with a corresponding chamber of the, or each other group of chambers such that the first and second solvent streams pass through arrays of the chambers.

9. [The improvement as defined in claim 1, further comprising] *A method for causing electrophoretic migration of at least one macromolecular solute from a first solvent stream to a second solvent stream in an apparatus comprising a housing, a pair of electrodes position in the housing, each of the electrodes being positioned adjacent one of a pair of opposite ends of the housing and each of the electrodes being surrounded by means to direct a flow of a buffer past the electrode, first inlet means through which the first solvent stream is fed into the housing and associated first outlet means, second inlet means through which the second solvent stream is fed into the housing and associated second outlet means, a plurality of electrophoretic membranes extending in substantially parallel, spaced apart, array transversely of the housing and between the electrodes, the membranes being structured to form a first solvent path for the first solvent stream and a separate second solvent path for the second solvent stream, the improvement comprising the step of periodically one of stopping and reversing a voltage applied across the electrodes, while maintaining a net movement of the macromolecular solute from the first solvent stream to the second solvent stream and while maintaining the first solvent stream in the first solvent path and the second solvent stream in the second solvent path, and providing more than two of the solvent streams and separating each of the solvent streams from an adjacent one of the solvent streams by one of the membrane, the membrane separating the solvent streams having pore sizes decreasing in a direction in which electrophoretic migration of the solute occurs.*

*10. The improvement as defined in claim 1, wherein the membranes have a sheet of porous material impregnated with polyacrylamide gel.*

*11. A method of separating at least two macromolecular solutes by causing electrophoretic migration of at least one of the solutes from a first solvent stream to a second solvent stream in an apparatus comprising a housing, a pair of electrodes positioned in the housing, each electrode being positioned adjacent one of a pair of opposed ends of the housing and each being surrounded by means to direct a flow of a buffer past the electrode, first inlet means through which the first solvent stream is introduced into the housing and outlet means therefor, second inlet means through which the second solvent stream is introduced into the housing and outlet means therefor, a plurality of electrophoretic membranes extending in substantially parallel, spaced apart, array transversely of the housing and between the electrodes, the membranes serving to define a first solvent path for the first solvent stream and a separate second solvent path for the second solvent stream the improvement comprising the steps of using the membranes with pores approaching in size molecules of at least the one solute; and a periodically one of stopping and reversing a voltage applied across the electrodes, while maintaining a net movement of the solute from the first solvent stream to the second solvent stream and while maintaining the first solvent stream in the first solvent path and the second solvent stream in the second solvent path, and producing a pulsatile flow of the first solvent stream through the housing.*

\* \* \* \* \*